United States Patent
Schlemmer

(10) Patent No.: US 7,063,176 B2
(45) Date of Patent: Jun. 20, 2006

(54) MEMBRANE FORMING IN-SITU POLYMERIZATION FOR WATER BASED DRILLING FLUID

(75) Inventor: Robert Schlemmer, Houston, TX (US)

(73) Assignee: M-I L.L.C., Houston, TX (US)

( * ) Notice: Subject to any disclaimer, the term of this patent is extended or adjusted under 35 U.S.C. 154(b) by 258 days.

(21) Appl. No.: 10/664,573

(22) Filed: Sep. 17, 2003

(65) Prior Publication Data

US 2004/0099446 A1 May 27, 2004

Related U.S. Application Data

(60) Provisional application No. 60/426,726, filed on Nov. 15, 2002, provisional application No. 60/411,317, filed on Sep. 17, 2002.

(51) Int. Cl.
*E21B 21/00* (2006.01)
*C09K 7/02* (2006.01)

(52) U.S. Cl. .......... 175/64; 166/294; 166/295; 166/300; 175/65; 175/72; 507/110; 507/129; 507/131; 507/249; 507/251; 507/268

(58) Field of Classification Search ........... 175/64, 175/65, 72; 166/294, 295, 300; 507/103, 507/110, 129, 131, 222, 248, 249, 251, 268
See application file for complete search history.

(56) References Cited

U.S. PATENT DOCUMENTS

| 3,628,615 | A | * | 12/1971 | Chenevert | 175/25 |
| 3,640,343 | A | * | 2/1972 | Darley | 166/292 |
| 4,716,966 | A | | 1/1988 | Shu | 166/295 |
| 5,558,171 | A | * | 9/1996 | McGlothlin et al. | 175/64 |
| 5,602,082 | A | * | 2/1997 | Hale et al. | 507/115 |
| 5,686,396 | A | * | 11/1997 | Hale et al. | 507/136 |
| 6,358,889 | B1 | * | 3/2002 | Waggenspack et al. | 507/110 |
| 6,703,351 | B1 | * | 3/2004 | Stowe et al. | 507/117 |
| 6,787,507 | B1 | * | 9/2004 | Coveney et al. | 507/266 |
| 2004/0011563 | A1 | * | 1/2004 | Mody et al. | 175/72 |
| 2005/0014655 | A1 | * | 1/2005 | Aston et al. | 507/211 |
| 2005/0039920 | A1 | * | 2/2005 | Tare et al. | 166/308.1 |

FOREIGN PATENT DOCUMENTS

WO 99/31353 A 6/1999

OTHER PUBLICATIONS

International Search Report—International Application No. PCT/US 03/30041—International Filing Date Sep. 17, 2003- Applicant: M-1 LLC.

\* cited by examiner

*Primary Examiner*—George Suchfield
(74) *Attorney, Agent, or Firm*—Osha Liang, LLP

(57) ABSTRACT

A method of increasing shale formation stability with a water based drilling fluid, the method including: delivering to the shale formation a drilling fluid formulated to include an aqueous fluid; a first reactant which is a soluble monomer, oligomer, or polymer with exposed ketone, aldehyde, or aldol groups or with groups which can be shifted to ketone or aldehyde functionality; and, a second reactant which is a primary amine, diamine, or polyamine which by condensation reaction forms a semi-soluble or precipitated filming product with the first reactant.

3 Claims, 3 Drawing Sheets

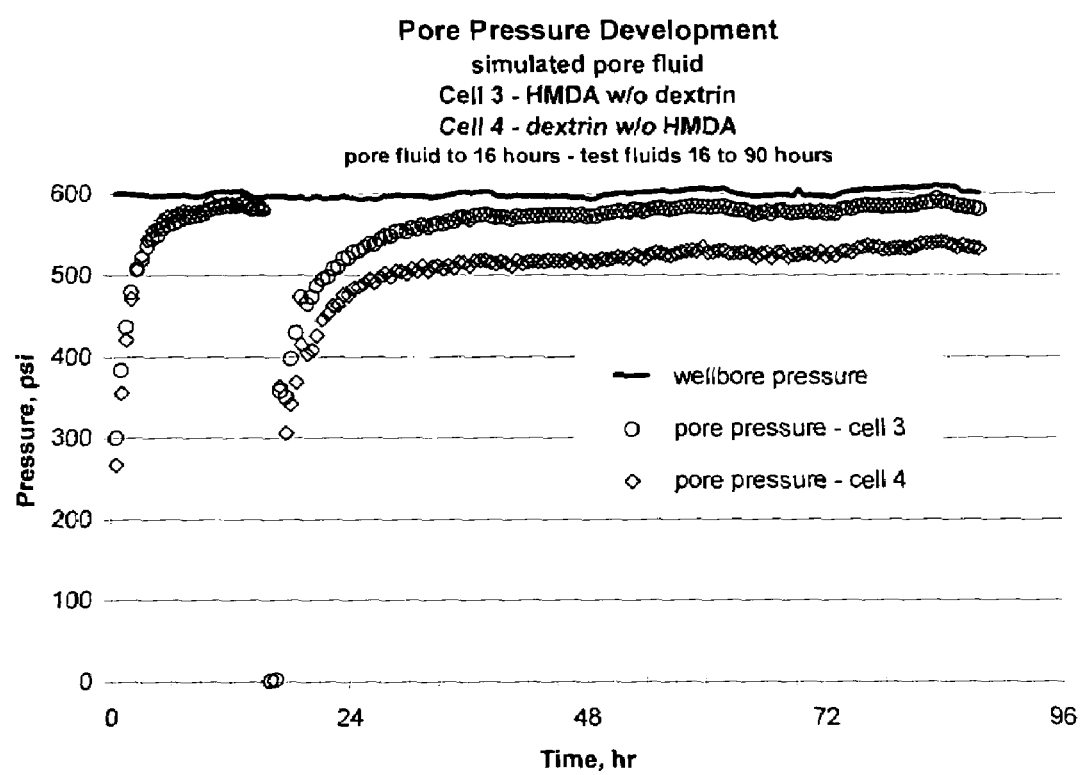

MEMBRANE FORMING IN-SITU POLYMERIZATION FOR WATER BASED DRILLING FLUID

Figure 1:
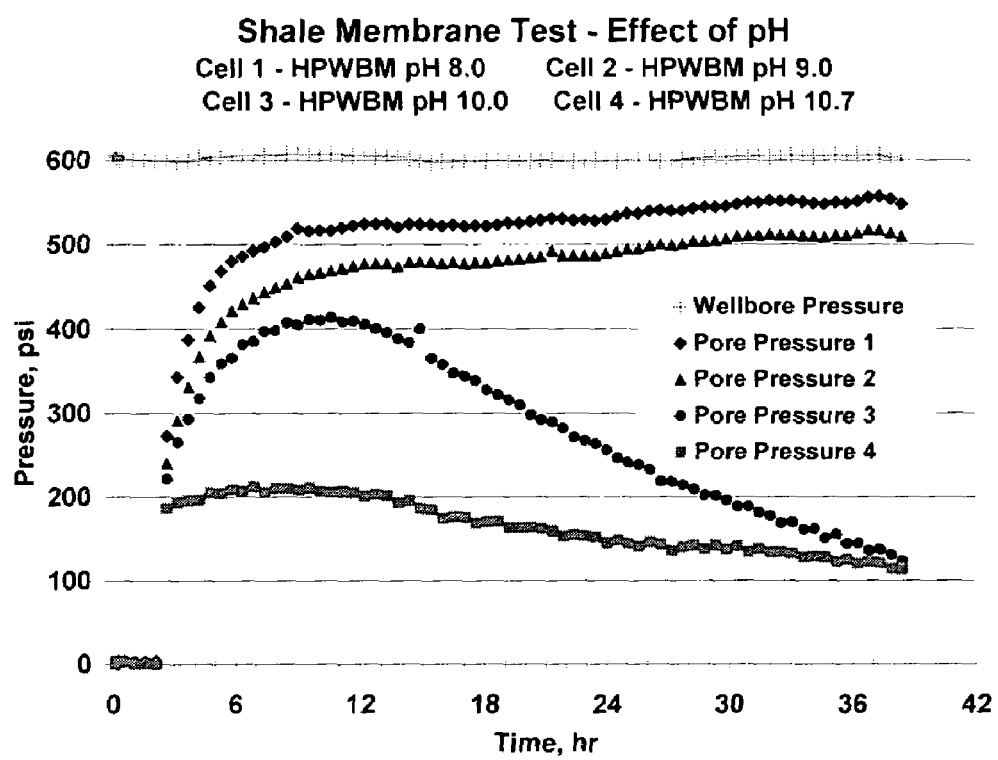

This application claims priority to U.S. Provisional Application No. 60/411,317 filed Sep. 17, 2002 and to U.S. Provisional Application No. 60/426,726, filed Nov. 15, 2002 the contents of both being incorporated herein by reference.

BACKGROUND

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low permeability filter cake that seals openings in formations penetrated by the bit and act to reduce the unwanted influx of formation fluids from permeable rocks.

Drilling fluids are typically classified according to their base material. In oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase. Pneumatic fluids are a third class of drilling fluids in which a high velocity stream of air or natural gas removes drill cuttings.

Three types of solids are usually found in water base drilling fluids: 1) clays and organic colloids added to provide necessary viscosity and filtration properties; 2) heavy minerals whose function is to increase the drilling fluid's density; and 3) formation solids that become dispersed in the drilling fluid during the drilling operation.

The formation solids that become dispersed in a drilling fluid are typically the cuttings produced by the drill bit's action and the solids produced by borehole instability. Where the formation solids are clay minerals that swell, the presence of either type of formation solids in the drilling fluid can greatly increase drilling time and costs.

Clay minerals are generally crystalline in nature. The structure of a clay's crystals determines its properties. Typically, clays have a flaky, mica-type structure. Clay flakes are made up of a number of crystal platelets stacked face-to-face. Each platelet is called a unit layer, and the surfaces of the unit layer are called basal surfaces.

A unit layer is composed of multiple sheets. One sheet is called the octahedral sheet, it is composed of either aluminum or magnesium atoms octahedrally coordinated with the oxygen atoms of hydroxyls. Another sheet is called the tetrahedral sheet. The tetrahedral sheet consists of silicon atoms tetrahedrally coordinated with oxygen atoms.

Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms.

The unit layers stack together face-to-face and are held in place by weak attractive forces. The distance between corresponding planes in adjacent unit layers is called the c-spacing. A clay crystal structure with a unit layer consisting of three sheets typically has a c-spacing of about $9.5 \times 10^{-7}$ mm.

In clay mineral crystals, atoms having different valences commonly will be positioned within the sheets of the structure to create a negative potential at the crystal surface. In that case, a cation is adsorbed on the surface. These adsorbed cations are called exchangeable cations because they may chemically trade places with other cations when the clay crystal is suspended in water. In addition, ions may also be adsorbed on the clay crystal edges and exchange with other ions in the water.

The type of substitutions occurring within the clay crystal structure and the exchangeable cations adsorbed on the crystal surface greatly affect clay swelling, a property of primary importance in the drilling fluid industry. Clay swelling is a phenomenon in which water molecules surround a clay crystal structure and position themselves to increase the structure's c-spacing thus resulting in an increase in volume. Two types of swelling may occur.

Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers, which results in an increased c-spacing. Virtually all types of clays swell in this manner.

Osmotic swelling is a second type of swelling. Where the concentration of cations between unit layers in a clay mineral is higher than the cation concentration in the surrounding water, water is osmotically drawn between the unit layers and the c-spacing is increased. Osmotic swelling results in larger overall volume increases than surface hydration. However, only certain clays, like sodium montmorillonite, swell in this manner.

Exchangeable cations found in clay minerals are reported to have a significant impact on the amount of swelling that takes place. The exchangeable cations compete with water molecules for the available reactive sites in the clay structure. Generally cations with high valences are more strongly adsorbed than ones with low valences. Thus, clays with low valence exchangeable cations will swell more than clays whose exchangeable cations have high valences.

In the North Sea and the United States Gulf Coast, drillers commonly encounter argillaceous sediments in which the predominant clay mineral is sodium montmorillonite (commonly called "gumbo shale"). Sodium cations are predominately the exchangeable cations in gumbo shale. As the sodium cation has a low positive valence (i.e. formally a +1 valence), it easily disperses into water. Consequently, gumbo shale is notorious for its swelling.

Clay swelling during the drilling of a subterranean well can have a tremendous adverse impact on drilling operations. The overall increase in bulk volume accompanying clay swelling impedes removal of cuttings from beneath the drill bit, increases friction between the drill string and the sides of the borehole, and inhibits formation of the thin filter cake that seals formations. Clay swelling can also create other drilling problems such as loss of circulation or stuck pipe that slow drilling and increase drilling costs. Thus, given the frequency in which gumbo shale is encountered in drilling subterranean wells, the development of a substance and method for reducing clay swelling remains a continuing challenge in the oil and gas exploration industry.

One method to reduce clay swelling is to use salts in drilling fluids. Salts, such as sodium, potassium, or calcium chloride, can reduce swelling of swelling clays such as sodium montmorillonite. Introduction of sodium ions to otherwise stable formations can cause detrimental effects to, for example, calcium clays due to ion exchange and conversion to sodium based swelling type clays. Increasing salinity often decreases the functional characteristics of drilling fluid additives.

Another method for controlling clay swelling is to use organic shale inhibitor molecules in drilling fluids. It is believed that the organic shale inhibitor molecules are adsorbed on the surfaces of clays with the added organic shale inhibitor competing with water molecules for clay reactive sites and thus serve to reduce clay swelling.

Another method of stabilizing the shale formation is to form a semi-permeable membrane over the shale to seal and protect the shale. Silicate containing drilling fluid deposits an external film on the drilled formation that allows water to migrate relatively freely while inhibiting movement of ions across the same film or membrane. This potential osmotic effect can cause a net movement of water out of the shale and inhibit shale swelling. Silicate containing drilling fluids form primarily external films on the drilled formation, which may work effectively for several days. However, logistics, handling and the cost of such fluids reduces the desirability of using such fluids.

Other film forming materials such as starch, cellulose, polyacrylate, sugar molasses, or methylglucoside have all been reported as being used to form a membrane at surface or within the surface of the shale and thus allow development of a relatively high osmotic pressure. However, these membranes are inefficient. The initial osmotic pressure may be elevated, but osmotic pressure steadily decreases for a period of hours to days. It has been reported that the membranes tend to inhibit or reduce ion movement, but do not preclude ion movement across the membrane. As a result of this movement, both ions and water are permitted to transit the membrane and thus a relatively rapid decrease in developed osmotic pressure.

It is important that the driller of subterranean wells be able to control the rheological properties of drilling fluids by using additives, including organic shale inhibitor molecules. In the oil and gas industry today it is desirable that additives work both onshore and offshore and in fresh and salt-water environments. In addition, as drilling operations impact on plant and animal life, drilling fluid additives should have low toxicity levels and should be easy to handle and to use to minimize the dangers of environmental pollution and harm to operators. Any drilling fluid additive should also provide desirable results but should not inhibit the desired performance of other additives. The development of such additives will help the oil and gas industry to satisfy the long felt need for superior drilling fluid additives which act to control the swelling of the clay and drilled formations without adversely affecting the rheological properties of drilling fluids. The claimed subject matter addresses this need.

SUMMARY

The claimed subject matter provides water based drilling fluids, which will form a semi-permeable (osmotic) membrane over a shale formation to increase wellbore stability. The membrane allows relatively free movement of water out of the shale, but significantly restricts the movement of ions across the membrane and into the shale or clay. Variables found to be of significance in producing a membrane of the claimed subject matter include the primary polymer content and molecular weight, the cross-linking diamine or polyamine content and molecular weight, and pH of the solution. By carefully selecting the primary polymer and cross-linking amine, the relative concentrations of these components, with adjustment of pH, cross-linking and polymerization and precipitation of components occurs which effectively forms an osmotically effective membrane on or within the face of exposed rock. The polymerization and precipitation of the osmotic membrane on the face of the exposed rock significantly retards water or ions from moving into or out of the rock formation, typically shale or clay. The ability to form an osmotic barrier results in an increased stability in the clays or minerals, which combine to make the rock through which the borehole is being drilled.

These and other features of the claimed subject matter are more fully set forth in the following description of preferred or illustrative embodiments of the claimed subject matter.

DESCRIPTION OF ILLUSTRATIVE EMBODIMENTS

The claimed subject matter involves the application of two reactants to form in situ a relatively insoluble Schiff base, which deposits as a semi-soluble or precipitated filming polymer product. This Schiff base coats clay surfaces to build an impermeable semi-soluble to insoluble polymer membrane on exposed shale encountered when drilling oil, gas, hydrate, mineral recovery or water production or injection wells.

Any soluble oligomer or low molecular weight polymer with a carbonyl (C=O) group is a candidate for application as Reactant #1 in the present process. Reactant #1 is a soluble monomer, oligomer, or polymer with exposed ketone or aldehyde/aldol groups or with groups which can be shifted to ketone or aldedyde functionality. The keto/aldol functionality is characterized by an unsaturated carbonyl group (C=O) or a group which can be converted to an unsaturated carbonyl group. These materials include but are not limited to aldehydes, ketones, synthetic polymers, branched or unbranched starches (crude, refined, and reacted or substituted of all types), dextrins, unsubstituted and substituted glucosides, corn syrup, modified corn syrup, malto-dextrins, molasses, sugars, celluloses (crude, refined, and reacted or substituted of all types), reducing sugars, and all the derivatives and reacted products thereof which present the unsaturated carbonyl group and any and all other oligomers or polymers which can form an unsaturated carbonyl group or aldehyde functionality.

Any soluble primary diamine or polyamine, diamino-acid or polyamino-acid, which by condensation reaction can form an insoluble crosslinked polymerized product when reacted with Reactant #1, is a candidate for use as the polymerizing material Reactant #2 for the claimed subject matter. Primary simple amines are also candidates for Reactant #2. If the chain length or chemical moieties allow solubility in the carrier solution, yet after condensation with Reactant #1 form an insoluble product then crosslinking of Reactant #1 is not always necessary for this process to occur.

Formation of the crosslinked polymerized product results from cross-linking and polymerization of a soluble reducing sugar, oligomer, or polymer by a typical primary amine as seen in the following reaction. In this case the primary amine is a diamine, but other primary amines and polyamines will also react in the same way.

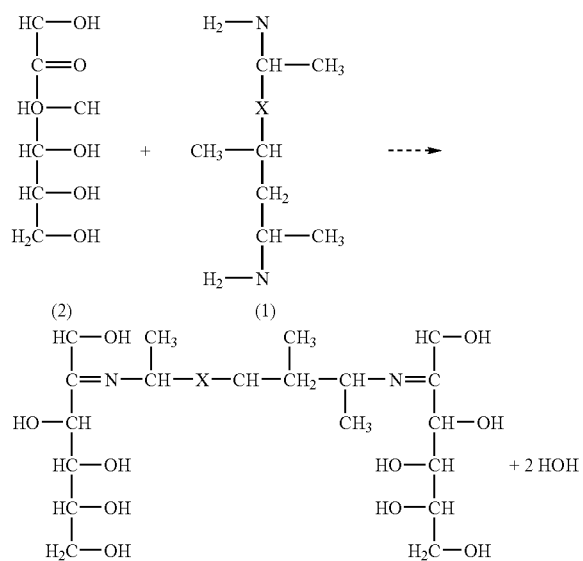

The reaction presented above is a simplified example, which illustrates a cross-linking mechanism. In many applications the primary amine or polyamine will provide the pH environment required to facilitate the reaction. Long chain amines, diamines, or polyamines with a relatively low amine ratio may require supplemental pH adjustment using materials such as sodium hydroxide, potassium hydroxide, sodium carbonate, potassium carbonate, or calcium hydroxide.

Component solubility is affected by the working environment established by the carrier brine concentration and temperature of application. Reactant #1 and Reactant #2 should be selected to be soluble in the specific working environment. Solubility is primarily associated with molecular weight and polymer chain length but component moieties of both reactants will also affect solubility.

The Schiff base formed by the reaction of Reactant #1 and Reactant #2 must be partially soluble or insoluble in the carrier brine in order to form a sealing membrane on shale or other formation exposed during drilling of a well. Carrier sodium chloride brine salinity typically and usually applied in the testing of the claimed subject matter is 20% w/w which is a commonly used standard concentration used for offshore drilling in the Gulf of Mexico—USA. Salt concentrations from 10% NaCl to saturation have been tested and found effective in complementing the reaction described herein. Application is not limited to sodium chloride based carrier solutions. The Schiff base forms in potassium chloride, calcium chloride, and sulfate and nitrate salt solution and sugar, and molasses solutions as well.

Salinity is not required for the Schiff reaction to occur. Proper selection of Reactant #1 and Reactant #2, each soluble in distilled, fresh, or tap water can produce a reaction product insoluble in fresh water and membrane formation would occur in that environment as well. If the water activity of the wellbore fluid is equal to or more than the water activity of the reservoir fluid then the desired osmotic pressure development would not occur. The membrane formed in this environment can reduce water flow or perfusion into or through shale by physical blockage and also contribute to shale stability despite not contributing to a strong osmotic effect.

Because many of the base materials and polymerizing amines suitable for this reaction "salt out" or "cloud out" as salinity and temperature increases (or as water activity decreases) a solubility study facilitates selection of components. If a large fraction of either Reactant #1 or the Reactant #2 "salts out" or "clouds out" of the carrier solution before polymerization, the reaction process will be slowed or stopped. If the polymer product (or condensate if Reactant #2 is a simple amine) remains soluble after polymerization, then no membrane will form.

The following examples are included to demonstrate preferred embodiments of the claimed subject matter. It should be appreciated by those of skill in the art that the techniques disclosed in the examples which follow represent techniques discovered by the inventors to function well in the practice of the claimed subject matter, and thus can be considered to constitute preferred modes for its practice. However, those of skill in the art should, in light of the present disclosure, appreciate that many changes can be made in the specific embodiments which are disclosed and still obtain a like or similar result without departing from the scope of the claimed subject matter.

EXAMPLE 1

Reactant and Concentration Pilot Testing & Selection

One typical study follows. Observation codes are presented in Table 1. Associated with Table 1, not presented here, are photographic results of an example

TABLE 1 example observations

| color | clarity | salting | precipitate | SCORE |
|---|---|---|---|---|
| white | clear-no change | none | none | 0 |
| yellow | 25% obscure | slight | slight | 1 |
| brown | 50% obscure | medium | medium | 2 |
| grey | 75% obscure | heavy | heavy | 3 |
| black | totally black | heaviest | heaviest | 4 | laboratory test for "salting" or "clouding" which are "scored" for precipitation of reacted product. Scoring follows the format presented in Table 1. The score 2-1-2-3 would indicate that the chemical mixture was: 2—brown in color, 1—about 25% obscured to light, 2—with medium and obvious phase change indicating a salting of material, 3—heavy precipitation or sedimentation on the bottom of the test tube. Test tube contents are scored over time. Data from typical tests is assembled and presented in Table 2 below.

There is usually no significant color change unless the "Reactant #1" is present. Sodium carbonate provides an environment of pH 9.9 and elicits a darkening of the solution in absence of the Reactant #2. The color changes are convenient markers that are most obvious when using carbohydrate materials for Reactant #1. The expected color changes are not always evident if long chain aldehydes, for example, are used as Reactant #1.

Most significant reaction as shown by color change, clouding, and precipitation is seen with the "Reactant #1"

and "Reactant #2" examined at the native pH provided by the "Reactant #2" in these approximate 20% salt solutions. The very significant darkening is normally associated with the classic Maillard reaction and provides evidence of formation of Schiff base polymerization.

The results of solubility and precipitation test results are confirmed in simulated wellbore membrane tests in which osmotic pressure development is measured. FIG. 3 presents actual test results that demonstrate the effectiveness of the polymer membrane formed from the condensation reaction of a dextrin (an oligosaccharide—approx molecular weight of 2000), and hexamethylene diamine. Results of this test are comparable with similar variant materials tested as Reactant #1. These variant materials have included dextrins of molecular weights of about 2000 to 10,000 provided by Aquasol, ADM, Grain Products Corp. and National Starch Co. as well as molasses (commercial food grade). Likewise a number of chemicals have been tested with equivalent results as Reactant #2. These include Special Products SP52 and SP54, experimental production lots of ethoxylated and propoxylated alkyl ether diamines; Huntsman Chemical Company Jeffamine D230, polyoxy propylene diamine, and another simpler diamine material, hexamethylene diamine, HMDA from Dow Chemical. Potential reactants #2 with molecular weight of up to 2000 have been evaluated.

Figure 2:
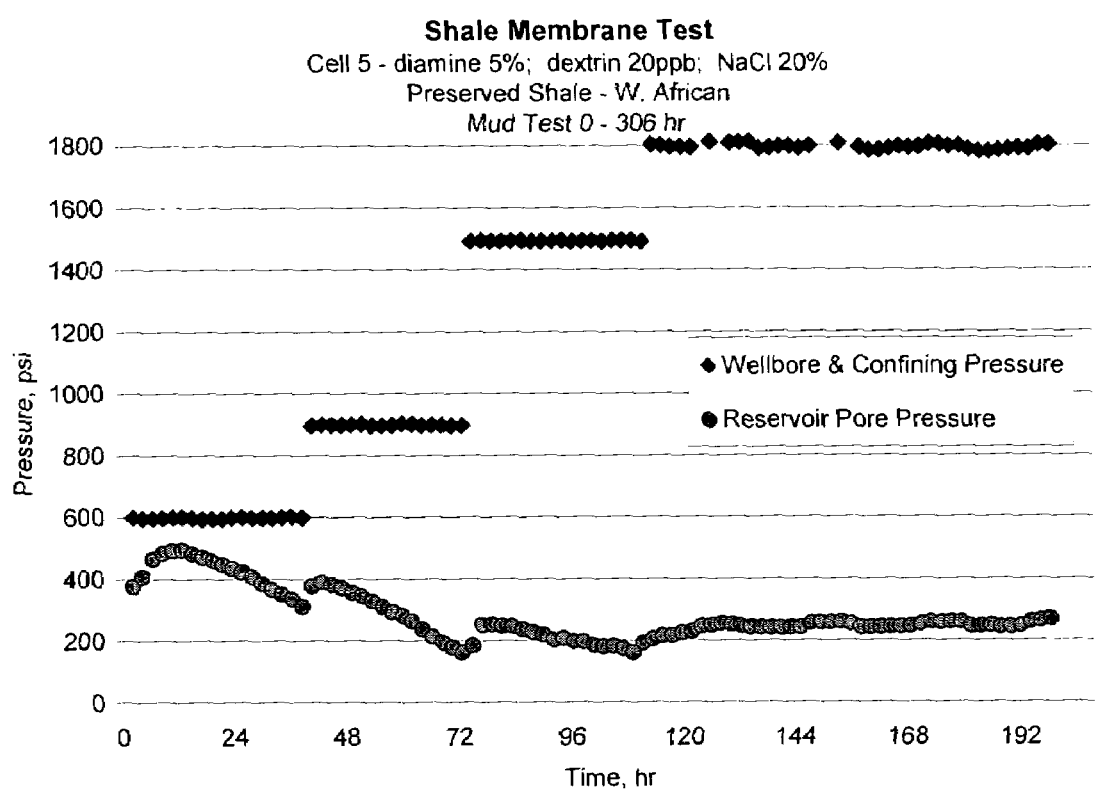

The test series presented in Table 2 displays heaviest precipitation and darkening of test fluids in columns M, T, and U. The precipitation and darkening displayed in this test generally corresponds to positive osmotic performance demonstrated in and described for FIGS. 1 and 2. The precipitation and darkening can be considered positive pilot and screening test generally predictive of membrane forming osmotic behavior of FIG. 2.

onstrated by change in pore pressure (osmotic pressure effect). The "Reservoir" will increase until equal to the 600 psi maintained on the "Wellbore". The four pressure curves described represent 4 individual tests on permeability matched individual and discrete shale pellets. At the onset of the test wellbore pressure was maintained at 600 psi and an initial Reservoir pressure of 200 psi was established. Within 4 to 12 hours depending upon pH in 2 cases a membrane was established and reservoir pressure dropped as water flowed from the reservoir across the shale sample and membrane to the Wellbore against the hydrostatic differential pressure.

The dextrin of interest is readily cross-linked by a particular primary diamine beginning at pH ~9.3. Crosslinking of the oligomer by the diamine and membrane formation at pH below 9 does not occur. At elevated pH, pH 10 and higher in this example, membrane development is profound as demonstrated by the decrease in recorded pore pressure in FIG. 1

EXAMPLE 3

Membrane and Osmotic Pressure Development in Shale

In this test (see FIG. 2) osmotic pressure development across a shale pellet (1 in D×0.25 in L) is measured. In the $1^{st}$ phase (0 through 15 hours in FIG. 2) of the test a simulated pore fluid (approx 5% salinity) is installed on each side of the shale pellet in a test cell. The "Wellbore" side of the pellet is held at a constant starting pressure of 600 psi. An initial hydraulic pressure of 200 psi is applied to the "Reservoir" side of the pellet. Due the pressure differential, fluid from the "Wellbore" will diffuse across the shale core and pressure will increase on the "Reservoir" side until

TABLE 2

COLOR-CLARITY-SALTING-PRECIPITATE SCORES
Chemical additions presented as % w/w

| Jun. 12, 2002 | M | N | O | P | S | T | U | V | W |
|---|---|---|---|---|---|---|---|---|---|
| Water, % | 66.2 | 66.2 | 74.0 | 74.0 | 77.0 | 69.0 | 71.0 | 69.0 | 70.0 |
| NaCl, % | 20.0 | 20.0 | 20.0 | 20.0 | 20.0 | 17.2 | 17.8 | 17.2 | 20.0 |
| alkyl ether diamine (SP 52 MW~200), % | 6.0 | 6.0 | 6.0 | 6.0 | 3.0 | 6.0 | 6.0 | 6.0 | |
| dextrin (Aquasol Aquadril 701 MW~2000), % | 7.8 | 7.8 | 0.0 | 0.0 | 0.0 | 7.8 | 5.2 | 7.8 | 7.8 |
| soda ash, % | | | | | | | | | 10 |
| Total, % | 100.0 | 100.0 | 100.0 | 100.0 | 100.0 | 100.0 | 100.0 | 100.0 | 97.8 |
| Adjust pH to: | native | 9.5 | native | 9.5 | native | native | native | 9.5 | 9.5 |
| measured pH | 10.7 | 9.5 | 11.5 | 9.4 | 11.4 | 11.4 | 11.5 | 9.6 | 9.9 |
| Temperature ° F. | 150 | 150 | 150 | 150 | 150 | 150 | 150 | 150 | 150 |
| observations | | | | | | | | | |
| initial | 0-0-0-0 | 0-0-0-0 | 0-0-0-0 | 0-0-0-0 | 0-0-0-0 | 0-0-0-0 | 0-0-0-0 | 0-0-0-0 | 0-0-0-0 |
| 15 min | 1-0-0-0 | 0-0-0-0 | 0-0-0-0 | 0-0-0-0 | 0-0-0-0 | 1-0-0-0 | 0-0-0-0 | 0-0-0-0 | 0-0-0-0 |
| 30 min | 1-0-0-0 | 0-0-0-0 | 0-0-0-1 | 0-0-0-0 | 0-0-0-1 | 1-0-0-0 | 1-0-0-0 | 0-0-0-0 | 0-0-0-1 |
| 45 min | 1-0-0-0 | 1-0-0-0 | 0-0-0-1 | 0-0-0-0 | 0-0-0-1 | 1-0-0-0 | 1-0-0-0 | 1-0-0-0 | 1-0-0-1 |
| 1 hour | 1-0-0-0 | 1-0-0-0 | 0-0-0-1 | 0-0-0-0 | 0-0-0-1 | 1-0-0-0 | 1-0-0-0 | 1-0-0-0 | 1-0-0-1 |
| 1 ½ hours | 2-0-0-0 | 1-0-0-0 | 0-0-0-1 | 0-0-0-0 | 0-0-0-1 | 2-0-0-0 | 2-0-0-0 | 1-0-0-0 | 1-0-0-1 |
| 2 hours | 2-0-0-1 | 1-0-0-1 | 0-0-0-1 | 0-0-0-0 | 0-0-0-1 | 2-0-0-1 | 2-0-0-1 | 1-0-0-1 | 1-0-0-1 |
| 18 hours | 4-4-0-0 | 2-0-0-0 | 0-0-0-1 | 0-0-0-0 | 0-0-0-1 | 4-4-0-0 | 4-4-0-1 | 4-4-0-1 | 2-0-0-1 |

EXAMPLE 2 pH and Osmotic Pressure Development in Shale

In this test (see FIG. 1) osmotic pressure development across a shale pellet (1 in D×0.25 in L) is measured. The test compares the effect of a range of pH on membrane development. Semi-permeable membrane development is demequal to the pressure on the "Wellbore" side. Because fluids and salinities are equal on both sides of the membrane no differential pressure development can occur and pressure on the "Reservoir" will increase until equal to the 600 psi maintained on the "Wellbore".

At the onset of Phase 2 (15 through 192 hours in FIG. 2) the pore fluid in the Wellbore side of the test cell is removed and replaced by a test brine containing the freshly mixed "Reactant #1" and the "Reactant #2". Again the Wellbore pressure was maintained at 600 psi and an initial Reservoir pressure of 200 psi was established. Within 2 hours a membrane was established and reservoir pressure dropped as water flowed from the reservoir across the shale sample and membrane to the Wellbore against the hydrostatic differential pressure. Pressure drop was profound and the Wellbore pressure was increased to 1500 psi and then to 1800 psi to balance the hydrostatic and developed osmotic pressure. The test shows stable osmotic pressure development of about 1600 psi. The curve after stabilization (116 hours) displays slope of near zero implying high membrane efficiency. At 1600 psi differential pressure the membrane efficiency is 100%. If salt freely diffused across the membrane from the fluid of higher salt concentration (Wellbore) to the fluid of lower salt concentration (Reservoir) the slope of the pressure curve after 116 hours would be positive as the salinities on both sides of the membrane approach equilibrium.

EXAMPLE 3

Failed Membrane and Osmotic Pressure Development in Shale

FIG. 3 presents a test of a dextrin Reactant #1 in 20% NaCl solution without a polymerizing material and the HDMA polymerizing material Reactant #2 in 20% NaCl solution without dextrin. Reactant #2 material, as used alone in this test, did not develop a measurable membrane or osmotic pressure. Reactant #1 material, as used alone in this test, did develop a modest membrane and measurable osmotic pressure of less than 100 psi.

In view of the preceding disclosure one of skill in the art should appreciate that one illustrative embodiment of the claimed subject matter includes a water based drilling fluid capable of forming a membrane through in situ polymerization. The illustrative drilling fluid includes: an aqueous continuous phase; a first reactant, wherein the first reactant is a soluble monomer, oligomer, or polymer with exposed ketone, aldehyde or aldol groups or with groups which can be shifted to ketone or aldehyde functionality; and, a second reactant which is a primary amine, diamine, or polyamine which by condensation reaction forms semi-soluble or precipitated filming product with the first reactant. In one preferred embodiment, the first reactant is selected from the group including: an aldehyde, a ketone, a synthetic polymer, branched starch, unbranched starch, dextrin, methylglucoside, substituted methylglucoside, corn syrup, malto-dextrin, molasses, sugar, cellulose, reducing sugars, polymerized reducing sugars and mixtures and combinations of these and similar compounds known to one of skill in the art. In another illustrative embodiment, the second reactant is an amino acid or polyamino acid. Alternatively, the second reactant is selected from the group consisting of hexamethylene diamine (HMDA), ethoxylated alkyl ether amine, propoxylated alkyl ether amine, polyoxy propylene diamine, and combinations of these and similar compounds known to one of skill in the art. The aqueous fluid component of the illustrative drilling fluid preferably contains a salt. Thus in one exemplary embodiment, the salt is selected from sodium chloride, potassium chloride, calcium chloride, sodium sulfate, potassium sulfate, calcium sulfate, sodium nitrate, potassium nitrate, calcium nitrate and combinations of these and similar compounds known to one of skill in the art.

Also encompassed within the scope of the claimed subject matter is a method of making a water based drilling fluid as substantially described above. One such illustrative method may include: mixing together the following: an aqueous fluid; a first reactant which is a soluble monomer, oligomer, or polymer with exposed ketone, aldehyde, or aldol functional groups or with groups which can be shifted to ketone or aldehyde functionality; and, a second reactant which is a primary amine, diamine, or polyamine which by condensation reaction forms a semi-soluble or precipitated filming product with the first reactant.

The claimed subject matter also includes a method of drilling a well in a formation with shale using a drilling fluid as described herein. In one such illustrative embodiment, the drilling fluid includes: an aqueous fluid; a first reactant which is a soluble monomer, oligomer, or polymer with exposed ketone, aldehyde, or aldol groups or with groups which can be shifted to ketone or aldehyde functionality; and, a second reactant which is a primary amine, diamine, or polyamine which by condensation reaction forms a semi-soluble or precipitated filming product with the first reactant; to create an osmotic membrane on the shale formation.

A further illustrative embodiment of the claimed subject matter includes a method of increasing shale formation stability with a water based drilling fluid as is substantially disclosed above. Such an illustrative method involves the delivering to the shale formation a drilling fluid formulated to include: an aqueous fluid; a first reactant which is a soluble monomer, oligomer, or polymer with exposed ketone, aldehyde, or aldol groups or with groups which can be shifted to ketone or aldehyde functionality; and, a second reactant which is a primary amine, diamine, or polyamine which by condensation reaction forms a semi-soluble or precipitated filming product with the first reactant.

Lastly it will be appreciated by one of skill and knowledge in the art that the claimed subject matter encompasses a method of generating an osmotic membrane over a shale formation. One such illustrative method includes delivering to the shale formation a drilling fluid as is substantially disclosed above. One such illustrative fluid includes: an aqueous fluid; a first reactant which is a soluble monomer, oligomer, or polymer with exposed ketone, aldehyde, or aldol groups or with groups which can be shifted to ketone or aldehyde functionality; and, a second reactant which is a primary amine, diamine, or polyamine which by condensation reaction forms a semi-soluble or precipitated filming product with the first reactant.

While the apparatus, compositions and methods of the claimed subject matter have been described in terms of preferred or illustrative embodiments, it will be apparent to those of skill in the art that variations may be applied to the process described herein without departing from the concept and scope of the claimed subject matter. All such similar substitutes and modifications apparent to those skilled in the art are deemed to be within the scope and concept of the claimed subject matter.

What is claimed is:

1. A method of drilling a well in a formation with shale comprising:
   drilling using a drilling fluid comprising:
      an aqueous fluid;
      a first reactant which is a soluble monomer, oligomer, or polymer with exposed ketone, aldehyde, or aldol groups or with groups which can be shifted to ketone or aldehyde functionality, selected from the group consisting of: an aldehyde, a ketone, a synthetic polymer, branched starch, unbranched starch, dextrin, methylglucoside, substituted methylglucoside, corn syrup, malto-dextrin, molasses, sugar, cellulose, reducing sugars, polymerized reducing sugars, and mixtures and combinations thereof; and a second reactant which is a primary amine, diamine, or polyamine, selected from the group consisting of hexamethylene diamine, ethoxylated alkyl ether amine, propoxylated alkyl ether amine, polyoxy propylene diamine, and combinations thereof, which by condensation reaction forms a semi-soluble or precipitated filming product with the first reactant; to create an osmotic membrane on the shale formation.

2. A method of increasing shale formation stability with a water based drilling fluid comprising:

delivering to the shale formation a drilling fluid comprising:

an aqueous fluid;

a first reactant which is a soluble monomer, oligomer, or polymer with exposed ketone, aldehyde, or aldol groups or with groups which can be shifted to ketone or aldehyde functionality, selected from the group consisting of: an aldehyde, a ketone, a synthetic polymer, branched starch, unbranched starch, dextrin, methylglucoside, substituted methylglucoside, corn syrup, malto-dextrin, molasses, sugar, cellulose, reducing sugars, polymerized reducing sugars, and mixtures and combinations thereof; and a second reactant which is a primary amine, diamine, or polyamine, selected from the group consisting of hexamethylene diamine, ethoxylated alkyl ether amine, propoxylated alkyl ether amine, polyoxy propylene diamine, and combinations thereof, which by condensation reaction forms a semi-soluble or precipitated filming product with the first reactant; to create an osmotic membrane on the shale formation.

3. A method of generating an osmotic membrane over a shale formation comprising:

delivering to the shale formation a drilling fluid comprising:

an aqueous fluid;

a first reactant which is a soluble monomer, oligomer, or polymer with exposed ketone, aldehyde, or aldol groups or with groups which can be shifted to ketone or aldehyde functionality, selected from the group consisting of: an aldehyde, a ketone, a synthetic polymer, branched starch, unbranched starch, dextrin, methylglucoside, substituted methylglucoside, corn syrup, malto-dextrin, molasses, sugar, cellulose, reducing sugars, polymerized reducing sugars, and mixtures and combinations thereof; and a second reactant which is a primary amine, diamine, or polyamine, selected from the group consisting of hexamethylene diamine, ethoxylated alkyl ether amine, propoxylated alkyl ether amine, polyoxy propylene diamine, and combinations thereof, which by condensation reaction forms a semi-soluble or precipitated filming product with the first reactant; to create an osmotic membrane on the shale formation.

* * * * *